US012566470B2

(12) United States Patent (10) Patent No.: US 12,566,470 B2
Narayanan et al. (45) Date of Patent: Mar. 3, 2026

(54) POWER SHARING BY MULTIPLE EXPANSION CARDS

(71) Applicant: Intel Corporation, Santa Clara, CA (US)

(72) Inventors: Vishal Narayanan, Bengaluru (IN); Anil Baby, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 702 days.

(21) Appl. No.: 17/744,197

(22) Filed: May 13, 2022

(65) Prior Publication Data

US 2023/0367368 A1 Nov. 16, 2023

(51) Int. Cl.
G06F 1/16 (2006.01)
G06F 1/3206 (2019.01)

(52) U.S. Cl.
CPC .......... G06F 1/1632 (2013.01); G06F 1/3206 (2013.01)

(58) Field of Classification Search
None
See application file for complete search history.

(56) References Cited

U.S. PATENT DOCUMENTS

| | | | | |
|---|---|---|---|---|
| 9,791,900 | B1 * | 10/2017 | Beall | .................. H05K 7/20727 |
| 2014/0372783 | A1 * | 12/2014 | Wade | .................... G06F 1/3206 |
| | | | | 713/340 |
| 2018/0120908 | A1 * | 5/2018 | Pilz | ........................ G06F 1/266 |

* cited by examiner

*Primary Examiner* — Farley Abad
*Assistant Examiner* — Dayton Lewis-Taylor
(74) *Attorney, Agent, or Firm* — Essential Patents Group, LLP

(57) ABSTRACT

A first printed circuit board (PCB) comprises a first hardware interface, compatible with an interface standard, to couple the first PCB to a first socket of a second PCB, which further comprises a second socket, and first and second busses respectively coupled to the first and second sockets. The first PCB comprises a second hardware interface to communicate a first signal, to indicate a total current drawn by multiple PCBs, and a second signal each with a third PCB while the third PCB is coupled to the second PCB at the second socket. The first PCB comprises circuitry to impose a limit on power consumption by the first PCB, circuitry to generate, with the third PCB, the first signal, and circuitry to generate a second signal, which is to provide, for each of the multiple PCBs, an indication of whether respective circuitry of the PCB is to be throttled.

20 Claims, 4 Drawing Sheets

POWER SHARING BY MULTIPLE EXPANSION CARDS

BACKGROUND

1. Technical Field

This disclosure relates to computer systems, and more specifically, to computer systems that include two or more expansion cards.

2. Background Art

Computer systems, such as desktop, mobile, and server type systems, generally include a motherboard having two or more slots for receiving expansion cards. An expansion card, sometimes referred to as an add-in card, is a printed circuit board (PCB) having components that expand the functionality of the computer system. An expansion card may add functions such as accelerating graphics operations, providing an interface to a network or a bus, or providing audio functions. Slots may also be referred to as expansion slots or sockets. Each slot is designed to receive a connector of an expansion card. There may be a variety of types of expansion slots on a motherboard, each with a different form factor and other specifications.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only. Elements of the figures having the same reference numbers (or names) as the elements of any other figure can operate or function in any manner similar to that described, but are not limited to such.

DETAILED DESCRIPTION

Figure 1:
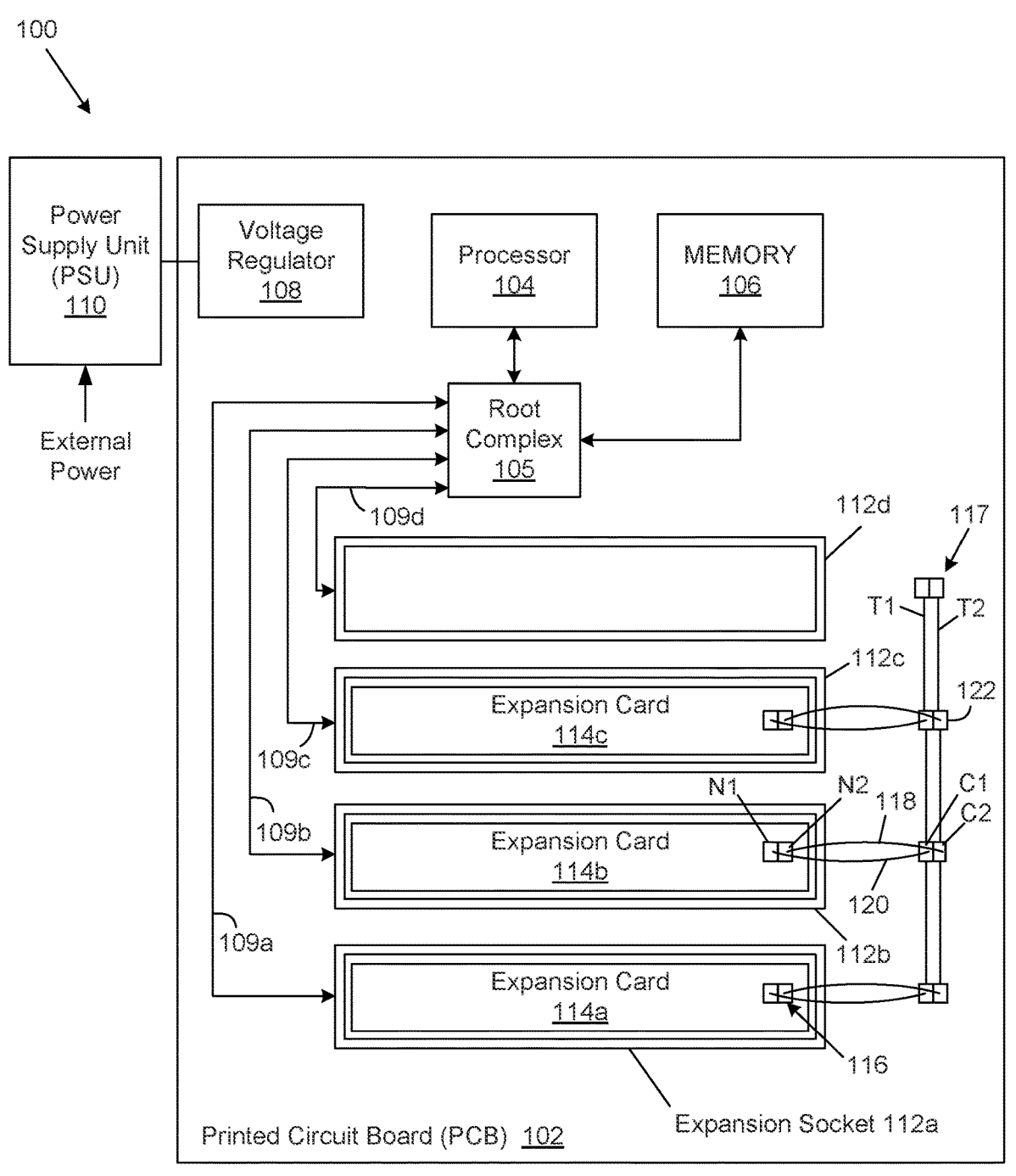
FIG. 1 is a functional block diagram illustrating elements of a computing system in which two or more expansion cards combine the individual power budgets of each card and share the combined power budget in accordance with some embodiments.

The expansion card slots on a motherboard may have different form factors and other specifications. For example, each expansion card slot may have power consumption limits associated with the slot, such as maximum or average power consumption limits. These power consumption limits can constrain expansion card performance. For instance, if an expansion card could consume power exceeding a slot power limit during peak workloads, it may perform better than is possible if the card stayed within the power limit. As another example, an expansion card may be designed to adhere to a small form factor. However, the small form factor is typically associated with a small power consumption limit and the expansion card may provide superior performance if it had a large power consumption limit associated with a large form factor.

While a slot power consumption limit can constrain performance of some expansion cards at certain times, there may be other expansion cards that operate under their power consumption limit in the same time period. This phenomenon can be dynamic. At one point in time, performance of a first expansion card may be constrained by its power limit while a second expansion card may perform satisfactorily using an amount of power well under its power limit. For example, the first expansion card may be subject to a peak workload while the second expansion card is in an idle or standby mode. At a later point in time, the power needs of the first and second cards may be reversed.

In addition to power consumption limits associated with expansion slots, there may be an overall power limit for all of the expansion slots on a mother board, or all of the expansion slots on the board linked to a particular bus. In an example, a motherboard may have two expansion slots for a PCIe bus. Each slot may have a 75 W power limit so the total power limit is 150 W. If the first expansion card is operating at 10% of its power limit or 7.5 W, and the second expansion card is operating at 100% of its power limit or 75 W, it may be advantageous if the second card could use the portion of the first card's power limit not currently being used by the first card. This would permit the second card to use 67.5 W+75 W=142.5 W and the combined power use of the two cards would still stay within the overall power limit of 150 W for the two cards.

While most expansion card slots on a motherboard may have an expansion card, there may be some empty slots. In another example, a motherboard may have three expansion slots for a PCIe bus. Each slot may have a 75 W power limit so the total power limit is 225 W. Assume two slots have expansion cards while the third is empty. If the first and second expansion cards are operating at 100% of their power limits, it may be advantageous if the first and second card could use the portion of the overall power limit not being used by the empty slot. This would permit the first and second cards to each use 37.5 W+75 W=112.5 W and the combined power use of the two cards would still stay within the overall power limit of 225 W for the three expansion slots.

In various embodiments, a first expansion card comprises a first printed circuit board (PCB). A second PCB, e.g., a motherboard, comprises first and second sockets, and a first bus coupled to the first socket and a second bus coupled to the second socket. The first PCB comprises a first hardware interface compatible with an interface standard. The first hardware interface to couple the first PCB to the first socket of the second PCB. The first PCB also comprises a second hardware interface to communicate a first signal and a second signal each with a third PCB of a second expansion card while the third PCB is coupled to the second PCB at the second socket.

The first PCB of the first expansion card also comprises first circuitry coupled to receive power via the first hardware interface; second circuitry to impose a first limit on a first power consumption by the first PCB; third circuitry, coupled to the first hardware interface and to the second hardware interface, to generate, with the third PCB (and, in some embodiments, with additional PCBs, if any, installed on the second PCB), the first signal, which is to indicate a total current drawn by multiple PCBs comprising the first PCB and the third PCB. The first signal may be an analog voltage representing the total power divided by the number of PCBs or cards. In addition, the first PCB may also comprise fourth circuitry, coupled to the third circuitry and to the second hardware interface, to generate, with the third PCB (and, in some embodiments, with additional PCBs, if any, installed on the second PCB) and based on the first signal, the second signal, which is to provide, for each of the multiple PCBs, a respective indication of whether respective circuitry of the PCB is to be throttled, wherein the second signal is to indicate whether the first circuitry is to be throttled.

An advantage of various embodiments is that if a first one of two or more expansion cards is using less than its full power budget at some point in time, the other expansion cards may use the unused portion of the first card's power budget during the time interval. Another advantage is that if an expansion slot is not being used, expansion cards in filled expansion slots may use the power budget allowed for the empty slot. More generally, an advantage of various embodiments, is that an individual expansion card may be allowed to exceed the power limit specified for its expansion slot by a bus specification, such as PCIe, for a short duration, which may improve performance of the individual expansion card, as well improving overall performance of the system. In addition, these performance improvements may be attained while, at the same time, adhering to the requirements of the bus specification.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. A module may comprise a circuit or circuitry, as defined below. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The terms "functional block," "functional unit," or "component" herein generally refer to any circuitry that performs a particular function. A "functional block" or "component" may be a unit of logic, circuit, cell, or chip layout that is reusable. A functional block is sometimes colloquially referred to as an IP (intellectual property) block. A few examples of functional blocks or components include processor cores, memories, caches, floating point processors, memory controllers, bus controllers, graphics processors, transceivers, network interface controllers, and display controllers. One or more portions of a larger functional block can themselves be designated as functional blocks. For example, an instruction execution unit and cache controller can be functional units or components of a processor functional unit. It should be appreciated that the foregoing examples are a non-exhaustive list of functional blocks.

As used herein, the terms "circuit" and "circuitry" comprise various electronic and electrical devices ("hardware"). Examples of hardware include analog circuits and analog circuit components (e.g., resistors, capacitors, inductors, diodes, and transistors). Other examples of hardware include digital circuits and digital circuit components, such as logic devices implementing Boolean functions. Examples of digital circuits include programmable logic devices (PLD), field programmable gate arrays (FPGA), application specific integrated circuits (ASIC), processors, processor cores, microprocessors, microcontrollers, digital signal processors (DSP), and graphics processing units (GPU). In yet another example, hardware includes a circuit that may be synthesized using a hardware description language (HDL) and which implements a state machine or other logic circuit. It should be understood that when hardware executes instructions stored in a memory device, the term hardware includes the stored instructions. Additional examples of hardware include volatile and non-volatile memory devices, such as registers, read-only memory (ROM), random access memory (RAM), and flash memory. Circuits and circuitry can include two or more instances of circuitry. Circuits and circuitry may comprise a combination of hardware elements that cooperate to provide one or more functions. A particular instance of a circuits and circuitry may be referred to with a descriptive or non-descriptive label. For example, instances of circuits and circuitry that perform various functions may be referred to as receiver circuitry, processor circuitry, first circuit, or second circuit. Each of two or more instances of a circuit and circuitry can be comprised of distinct components. In addition, two or more instances of a circuit or circuitry can share one or more common components or resources.

As used herein, the term "hardware interface" refers to one or more physical components of a given device, where said one or more physical components accommodate coupling to interact with one or more physical components of another device, e.g., via electrical or optical signals. For example, a hardware interface may comprise conductive contacts of a connector or a socket that receives a connector. As another example, a hardware interface may comprise metal contacts, pads, metallization features, or other interconnect structures on a surface of or within a circuit board or integrated circuit (IC) chip. As a further example, a hardware interface may comprise an interconnect between contacts of respective components, such as solder or an interposer. As a yet another example, a hardware interface may comprise an electrically conductive trace on a printed circuit board or an electrically conductive wire.

As used herein, the term "packaged device" means an integrated circuit (IC) comprising at least one IC chip. A packaged device may be a single IC chip or a host IC chip and one or more IC chiplets coupled to the host IC chip. The term "IC chiplet" refers to an IC die structure that is smaller than the host chip. A host die and an IC chiplet may be electrically interconnected with one another via a hardware.

Peripheral Component Interconnect Express (PCIe) is a standard described in various versions of the PCI Express Specification, such as PCI Express Card Electromechanical Specification Revision 5.0, Version 1.0 Jun. 9, 2021. In the specification, there are several types of PCI Express cards, each with a different pinout or form factor. According to some versions of the specification, PCI express cards may consume up to 10 W, 25 W, or 75 W, depending on the type of card. The maximum power consumption for a PCIe card may be referred to as the card's "power budget."

Embodiments described in this description relate to power budgets established for PCIe cards by a PCIe specification. PCI Express is one example of a specification that defines power budgets for expansion cards. While PCI Express may be used as an example in this description, it should be appreciated that the present disclosure is not limited to a particular PCI Express specification or to PCIe cards. It should be understood that descriptions about PCI Express and PCIe cards may apply to any other standard or specification that defines power limits or budgets for expansion cards.

FIG. 1 is a functional block diagram illustrating elements of a computing system in which two or more expansion cards combine the individual power budgets of each card and share the combined power budget in accordance with some embodiments. FIG. 1 schematically illustrates a computing device 100 (also referred to henceforth as device 100, or computing platform 100), according to some embodiments. In various embodiments, the device 100 may be any appropriate computing device or computing platform, e.g., a server system, a server rack, a laptop, a desktop, a mobile computing device, a cellular phone, and/or the like.

The device 100 may comprise a printed circuit board (PCB) 102 and a power supply unit (PSU) 110. A processor 104, memory 106, a voltage regulator 108, a root complex 105, a plurality of first busses, and a plurality of sockets may be disposed on the PCB 102. Although the device 100 may comprise multiple processors or a system-on-chip (SoC) 104, the example of FIG. 1 illustrates merely a single processor for purposes of illustrative clarity. The processor or SoC 104 may also be referred to as a "host" and may include multiple processing cores.

Memory 106 may comprise any of the examples tangible computer-readable media enumerated elsewhere herein, such as, but not limited to, read only memory (ROM), random access memory (RAM), and flash memory devices. Although only a single memory is shown in FIG. 1, the device 100 may comprise multiple memories in other embodiments.

An external power source supplies power to the PSU 110, such as an AC main. In the example of FIG. 1, it is assumed that the device 100 does not include a battery and battery charger, although the device 100 may include a battery and battery charger in some embodiments.

Elements referred to herein with a common reference label followed by a particular number or letter may be collectively referred to by the reference label alone. For example, sockets 112*a*, 112*b*, 112*c*, and 112*d* may be collectively and generally referred to as sockets 112 in plural, and socket 112 in singular. Similarly, elements shown in a figure with a common reference label followed by a particular number or letter may be collectively referred to by the reference label alone. For example, first busses 109*a*, 109*b*, 109*c*, and 109*d* shown in FIG. 1 may be referred to collectively and generally referred to as first buses 109 in the plural, and first bus 109 in the singular.

In various embodiments, the device 100 comprises two or more first busses 109 and two or more sockets 112. In some embodiments, sockets 112 may be PCIe expansion card slots. In various embodiments, the device 100 comprises two or more expansion cards 114. In some embodiments, expansion cards 114 may be PCIe expansion cards. As shown in FIG. 1, sockets 112*a*, 112*b*, 112*c* have an expansion card 114 inserted therein, while socket 112*d* is empty. While not shown in FIG. 1, each expansion card 114 comprises a first hardware interface to couple the expansion card to a socket 112 of PCB 102. The first hardware interface is described below with respect to FIG. 2. Each first bus 109 couples one of the sockets 112 with processor 104, memory 106, and other components on PCB 102 via root complex 105. In various embodiments, each first bus 109 includes bus lines for providing power to a socket 112 with which it is connected. A specification or standard for first busses 109 may specify peak and average power limits for each of sockets 112. In various embodiments, each first bus 109 is a PCIe bus.

In various embodiments, expansion cards 114 each comprise a respective second hardware interface 116 to communicate a first signal and a second signal each with one or more other expansion cards. (As described below, in various embodiments, the first signal is the V_Ipeak signal and the second signal is a throttle-enable signal.) In various embodiments, the second hardware interface 116 comprises a first conductive contact and a second conductive contact to communicate, respectively, the first signal and the second signal. In some embodiments the second hardware interfaces 116 may be two-wire connectors having a first terminal: node N1, and a second terminal: node N2. In various embodiments, the first and second conductive contacts may be, respectively, the first and second terminals: N1 and N2. As shown in FIG. 1, the respective second hardware interfaces 116 couple the expansion cards 114*a*, 114*b*, 114*c* to one another via a second bus 117. The second bus 117 comprises a first electrically conductive element 118 and a second electrically conductive element 120.

In some embodiments, the first electrically conductive element 118 of second bus 117 may be a wire connected between a first terminal N1 of a second hardware interface 116 on a first expansion card 114 and a first terminal N1 of a second hardware interface 116 on a second expansion card 114, e.g., a wire between the respective terminals N1 on expansion card 114*a* and expansion card 114*b*. Similarly, in some embodiments, the second electrically conductive element 120 of second bus 117 may be a wire connected between a second terminal N2 of a second hardware interface 116 on a first expansion card 114 and a second terminal N2 of a second hardware interface 116 on a second expansion card 114, e.g., a wire between the respective terminals N2 on expansion card 114*a* and expansion card 114*b*. In these embodiments, the second bus 117 comprises the wires connecting respective first and second terminals N1 and N2 of respective second hardware interfaces 116.

In other embodiments, the second bus 117 comprises electrically conductive structures T1 and T2 and sockets 122 in addition to first electrically conductive element 118 and second electrically conductive element 120. The second bus 117 may be separate and distinct from or integral with the PCB 102. When the second bus 117 is integral with the PCB, the electrically conductive structures T1 and T2 may be circuit traces. Sockets 122 may each comprise a connector C1 and C2. A first terminal N1 of a second hardware interface 116 of an expansion card 114 may be coupled with connector C1 of a socket 122, and a second terminal N2 of the second hardware interface 116 of the expansion card 114 may be coupled with connector C2 of the socket 122. In some embodiments, the second hardware interface 116 may couple with socket 122 via a plug-in arrangement without requiring connecting wires 118, 120. In other embodiments, a pair of wires 118, 120 may connect N1 and N2 of second hardware interface 116 with C1 and C2 of socket 122.

Although not illustrated in FIG. 1, the device 100 may include multiple other components, e.g., fans, integrated circuit (IC) chips, resistors, capacitors, and the like. Possible other components are omitted for purposes of illustrative clarity.

Figure 2:
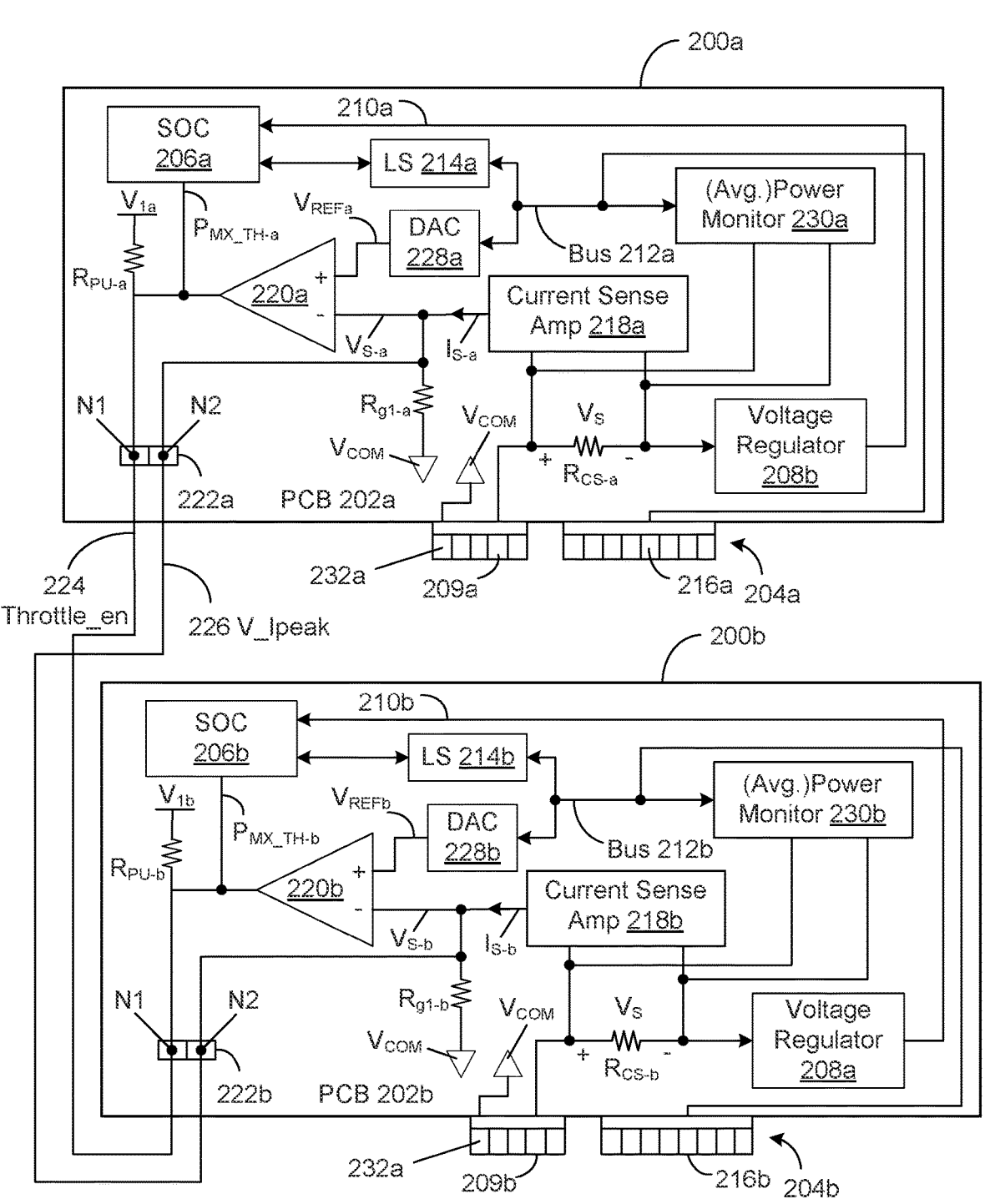
FIG. 2 is a functional block diagram illustrating two expansion cards configured to combine the individual power budgets of each card and share the combined power budget in accordance with some embodiments.

FIG. 2 is a functional block diagram illustrating two expansion cards that are configured to combine the individual power budgets of each card and share the combined power budget in accordance with some embodiments. FIG. 2 schematically illustrates a first expansion card 200*a* and a second expansion card 200*b*, according to some embodiments. While only two expansion cards are shown in FIG. 2, the shown configuration may be scaled to include additional expansion cards. Each card 200 may provide one or more functions that are different from other cards, however, this is not essential. For example, expansion card 200*a* may be a graphics card and expansion card 200*b* may be a network card. While the expansion cards 200*a*, 200*b* are shown with similar components in FIG. 2, it should be appreciated that each card may include other hardware and/or software components that are unique to the particular card. For example, expansion cards 200 may include a memory for storing machine-executable instructions, and the instructions stored for each card may be different. Hardware and/or software components that are unique to a particular card are omitted for purposes of illustrative clarity. In some embodiments, an expansion card 114 depicted in FIG. 1 may be the same as an expansion card 200.

In various embodiments, each of the expansion cards 200 comprises a PCB 202 comprising a first hardware interface 204. In some embodiments, first hardware interface 204 is an edge connector comprising a plurality of pins. It should be appreciated that the visual representation of first hardware interface 204 is not intended to be an accurate depiction of any particular first hardware interface or connector. In embodiments, the first hardware interfaces 204 may have a notch and any number of pins on either side of the notch. In various embodiments, first hardware interface 204 may be any type of connector defined in a PCIe specification. In some embodiments, each of the first hardware interfaces 204 shown in FIG. 2 may be PCIe compliant, both having a 75 W maximum power specification (power budget). In other embodiments, any of the first hardware interfaces 204 may be PCIe compliant having a 10 W, 25 W, or 75 W maximum power specification (power budget). In some embodiments, each first hardware interface 204 or expansion card in a device has the same power budget. However, this is not required, and in other embodiments, different first hardware interfaces or expansion cards can have different power budgets.

In embodiments, an SoC 206 and a voltage regulator 208 are mounted on each PCB 202. Each voltage regulator 208 is coupled with a respective pin 209 of first hardware interface 204. It should be appreciated that pin 209 shown in the figure may comprise one or more than one pin. Pins 209 receive a power supply signal, which is provided to voltage regulator 208. In embodiments, pins 209 may receive a +3.3V, +12V, or +3.3V_Aux V signal. Voltage regulator 208 provides one or more regulated output voltages, which supply power to various components mounted on PCB 202. For example, as shown in FIG. 2, voltage regulator 208 provides power to SoC 206 via power rail 210. It should be appreciated that pin 232 of first hardware interface 204 shown in the figure may comprise one or more than one pin. Pins 232 receive a $V_{COM}$ signal, which is provided to various components on PCB 202. The $V_{COM}$ signal is a common reference voltage, which may be, for example, 0V or a ground (GND) reference voltage.

The PCB 202 may have a bus 212, which may be, for example, an inter-integrated circuit (I2C) bus. The SoC 206 may be coupled with the bus 212 via a voltage level translator or shifter LS 214. It should be appreciated that pin 216 of first hardware interface 204 shown in the figure may comprise one or more than one pin. Bus 212 may be coupled with one or more pins 216. In embodiments, SoC 206 may communicate with a host or other logic on a motherboard, e.g., PCB 102, via bus 212, pins 216, and a system management bus (SMBus) on the motherboard. As one example communication, a host may send a reference voltage (described below) or another threshold to SoC 206.

In various embodiments, expansion cards 200 comprise current sense amplifiers 218, current sense resistors $R_{CS}$, load resistors $R_{g1}$, comparators 220, and second hardware interfaces 222. The second hardware interface 222 may be two-wire connectors having first and second terminals: node N1 and node N2. The second hardware interface 222 may be the same as second hardware interface 116. In operation, current sense amplifier 218 and current sense resistor $R_{CS}$ cooperate to measure total DC power being used by expansion card 200 as a voltage $V_S$. Current sense amplifier 218 converts the measured voltage $V_S$ into a current-proportional analog signal $I_S$. In an embodiment, the amplifier output $I_S=V_S\mathrm{*}k$, where k depends on the value of $R_{CS}$. It should be appreciated that $I_{S-a}$ may be equal to $I_{S-b}$ in some embodiments, and that $I_{S-a}$ is not equal to that $I_{S-b}$ in other embodiments. The current-proportional analog signal $I_S$ corresponds with instantaneous power consumed by the expansion card.

Each comparator 220 has a noninverting (+) input, an inverting (−) input, and an output. Referring first to expansion card 200a, in an embodiment, the output $I_{S-a}$ of current amplifier 218a is coupled with the inverting (−) input of comparator 220a and a first terminal of load resistor $R_{g1-a}$. A second terminal of load resistor $R_{g1-a}$ is coupled with $V_{COM}$. If the output $I_S$, were only connected to the inverting (−) input of comparator 220 and load resistor $R_{g1-a}$, the load resistor $R_{g1}$, would convert the current $I_S$, into a voltage $V_{S-a}$: $V_S=I_S\mathrm{*}R_{g1}$. However, the output $I_{S-a}$ is also connected to node N2 of second hardware interface 222a and, for this reason, $V_S$ must be calculated differently.

Referring now to expansion card 200b, the output $I_{S-b}$ of current amplifier 218b is coupled with the inverting (−) input of comparator 220b and load resistor $R_{g1-b}$, and node N2 of second hardware interface 222b in the same way the output of current amplifier 218a is coupled to corresponding components of expansion card 200a. In addition, it can be seen that N2 of 222a is coupled with N2 of 222b. It will be appreciated that N2 of second hardware interface 222a and N2 of second hardware interface 222b are electrically the same node. In addition, the $V_{COM}$ signal on both expansion boards is obtained from a bus, e.g., a PCIe bus, and the $V_{COM}$ signal on both expansion cards 200 has the same voltage value. Accordingly, the load resistors of the two cards, $R_{g1\_a}$ and $R_{g1\_b}$, are arranged in parallel between node N2 and $V_{COM}$. Another consequence of nodes N2 of second hardware interfaces 222a and 222b being the same node is that the sum of the currents $I_{S-a}$ and $I_{S-b}$ output from current sense amplifiers 218a and 218b, respectively, flowing into node N2 will equal the sum of currents flowing into the inverting (−) inputs of comparators 220a and 220b.

Because of the connections of current sense amplifier outputs $I_{S-a}$ and $I_{S-b}$ to node N2, the combined output current may be referred to as the V_Ipeak signal. The amplitude of V_Ipeak represents the average current drawn by each PCIe card, irrespective of the number of cards. The amplitude of V_Ipeak is also proportional to the total peak current drawn by all cards combined. The gain of the V_Ipeak signal remains same irrespective of the number of cards connected in parallel. As one example, the same level of signal V_Ipeak will be produced by a power use of 75 W on expansion card 200a and power use of OW on expansion card 200b as a power use of 37.5 W on each expansion card 200a and 200b.

The presence of the parallel load resistors $R_{g1\_a}$ and $R_{g1\_b}$ causes the V_Ipeak signal to appear as an analog voltage signal on the inverting inputs (−) of both comparators 220a and 220b. Rather than calculating voltage $V_{S-a}$: $V_S=I_S\mathrm{*}R_{g1}$, it is more useful to calculate the voltage V_Ipeak=$I_{S-average}\mathrm{*}$ ($R_{g1-a}$ in parallel with $R_{g1-b}$).

As shown in FIG. 2, the noninverting (+) input of comparator 220 is coupled with a control reference voltage $V_{REF}$ and the inverting input is coupled with $V_S$ (V_Ipeak signal 226). The comparators 220 determine the difference between the inputs and output an amplified version of the difference. The control reference voltage $V_{REF}$ and load resistor $R_{g1}$ are selected based on the power budget of the expansion card 200. In some embodiments, $R_{g1-a}$ equals $R_{g1-b}$, however, this is not required. In some embodiments, $V_{REF-a}$ equals $V_{REF-b}$, however, this is not required.

Referring to both expansion cards 200a and 200b, the output of each comparator 220 is coupled with an input to SoC 206 and pull-up resistor $R_{PU}$. Each pull-up resistor $R_{PU}$ is coupled with a voltage source $V_1$. In an embodiment, $V_1=1.8V$. The output of each comparator 220 is also coupled with a terminal node N1 of second hardware interface 222.

(The respective terminal nodes N1 of second hardware interfaces $222a$ and $222b$ are connected.) As such, node N1 is a common node for the outputs of comparators $220$, the inputs to SoCs $206$ and pull-up resistors $R_{PU}$, which are arranged in parallel. In various embodiments, the output of each comparator $220$ is an open-drain output.

The output of each comparator $220$ is a maximum power threshold signal $P_{MX\_TH}$, which is used as a logical value ("0" or "1") by SoCs $206$. In operation, when V_Ipeak exceeds $V_{REF}$, comparator $220$ generates an output indicating that signal $P_{MX\_TH}$ is asserted. (In various embodiments, $P_{MX\_TH}$ may be active low or active high.) When the signal $P_{MX\_TH}$ is asserted, SoC $206$ responds by reducing power consumed by the expansion card $200$, e.g., SoC $206$ may reduce a clock frequency at which the SoC or other components operate. As another example, a functional block in the SoC or on the expansion card may be placed in a sleep or standby mode. In various embodiments, any technique known in the art for reducing power consumption may be employed by SoC $206$. In various embodiments, SoC $206$ executes computer-executable instructions stored in a machine-readable medium (e.g., a memory), wherein the computer-executable instructions, when executed, implement a technique for reducing power consumption. Because the maximum power threshold signal $P_{MX\_TH}$, when enabled, causes a reduction in power consumption, this signal may also be referred to as the throttle enable signal Throttle_en $224$.

The assertion or non-assertion of the throttle-enable signal Throttle_en $224$ is determined by comparators $220$ and the jointly determined signal is shared with both SoCs $206$. Specifically, the output of each comparator $220$ forms a wired AND with other comparators $220$ of other expansion cards. If any comparator $220$ asserts the throttle enable signal Throttle_en $224$, all SoCs $206$ on all expansion cards will receive the throttle enable signal. If any comparator $220$ asserts the throttle enable signal, all of the expansion cards will be throttled so as to limit power consumption to the total power budget. This mechanism provides fast power control alongside with high peak power support and performance on a multi card system. The throttle-enable signal Throttle_en $224$ is based on instantaneous power consumption.

As mentioned, the amplitude of V_Ipeak represents the average current drawn by each PCIe card, irrespective of the number of cards. The amplitude of V_Ipeak controls the inverting input (−) of both comparators $220a$ and $220b$, which in turn controls whether the throttle-enable signal Throttle_en $224$ is asserted. Because the throttling level is based on the combined power budget of the both expansion cards $200$, the effective throttling level for one expansion card $200$ increases during periods when the output current $I_S$ of the other expansion card $200$ is in a valley (not using its full power budget). In other words, because the power budgets of the cards are combined, $I_{S-a}$ may be able to exceed the level which would cause $P_{MX\_TH}$ to be asserted if based on the power budget for card $200a$ alone during periods when card $200b$ is not using all of its power budget. Whether and how much $I_{S-a}$ may exceed the power budget of card $200a$ alone depends on how much spare power budget card $200b$ can provide.

When multiple PCIE cards are connected in parallel through second hardware interfaces $222$, and all expansion cards draw same amount of power, the V_Ipeak signal output is as shown in expressions (1) and (2) below:

$$V\_Ipeak\ signal = Is*number\ of\ cards*Rg1/number\ of\ cards. \quad (1)$$

$$V\_Ipeak\ signal = Is*Rg1. \quad (2)$$

Expression (2) holds irrespective of the number of expansion cards in parallel. However, when one or two expansion cards are drawing lesser current, this solution will allow more current (and performance) for a third expansion card before the V_Ipeak signal reaches the same max current threshold.

In some embodiments, each expansion card has the same individual power budget and the total power budget is determined by multiplying the power budget by the number of expansion cards. For example, the total power budget for three 75 W expansion cards is: 75 W*3=225 W. In some embodiments, one or more expansion cards has a different individual power budget and the total power budget is determined by summing the individual power budgets of all of the expansion cards.

In some embodiments, expansion cards $200$ comprise an optional digital-to-analog converter (DAC) $228$, which outputs the control reference voltage $V_{REF}$ to the noninverting (+) input to comparator $220$. SoC $206$ or a host (processor or SoC $104$) may use DAC $228$ to set control reference voltage $V_{REF}$. This is useful in cases where there are empty expansion slots. The host can allocate the power budget of an empty expansion slot for use by the expansion cards that are present. In an embodiment, the host can allocate power budget of the empty slot by adjusting the control reference voltages $V_{REF}$.

As mentioned, the throttle-enable signal Throttle_en $224$ is based on instantaneous power consumption for the combined cards. A bus specification, such as PCIe, may also specify an average power limit for slots connected to the bus. Accordingly, even if the peak power exceeds the per card power limits for a short period, e.g., several mS, in order to provide better performance, the average power must be controlled to the specification limits. In various embodiments, expansion cards $200$ include average power monitor $230$.

Average power monitor $230$ comprises two inputs connected to respective terminals of current sense resistor $R_{CS}$ to obtain measurements of $V_S$. In various embodiments, average power monitor $230$ comprises an analog-to-digital (ADC) converter to convert the measured voltage $V_S$ into a digital value representing total power drawn at a sample time. Average power monitor $230$ collects a plurality of samples during a sample period and determines an average power value. In embodiments, average power monitor $230$ compares the determined average power value with an average power limit for the slot. If the average power value exceeds the average power limit, average power monitor $230$ notifies SoC $206$ via bus $212$. When so notified, SoC $206$ implements a technique for reducing power consumption.

The lower bandwidth current sense path through the average power monitor $230$ is used by the SoC $206$ to control the average power of individual cards to meet specifications. The average power monitor $230$ also prevents any one expansion card from continuously using a large share of the combined power budget and not sharing with other expansion cards, sometimes referred to as "power hogging."

As described above, embodiments provide a quick high priority peak current clamp loop and a slower average current control loop. Thresholds for both control loops can be adjusted by the host optionally based on unused expansion card slots. The peak current clamp loop employs a hardware comparator with a common open drain output for all cards. Once the peak current threshold is hit, all cards will throttle together. The average current control loop employs an average power monitor that includes an ADC and communicates with the SoC via a bus on board the expansion card.

Figure 3:
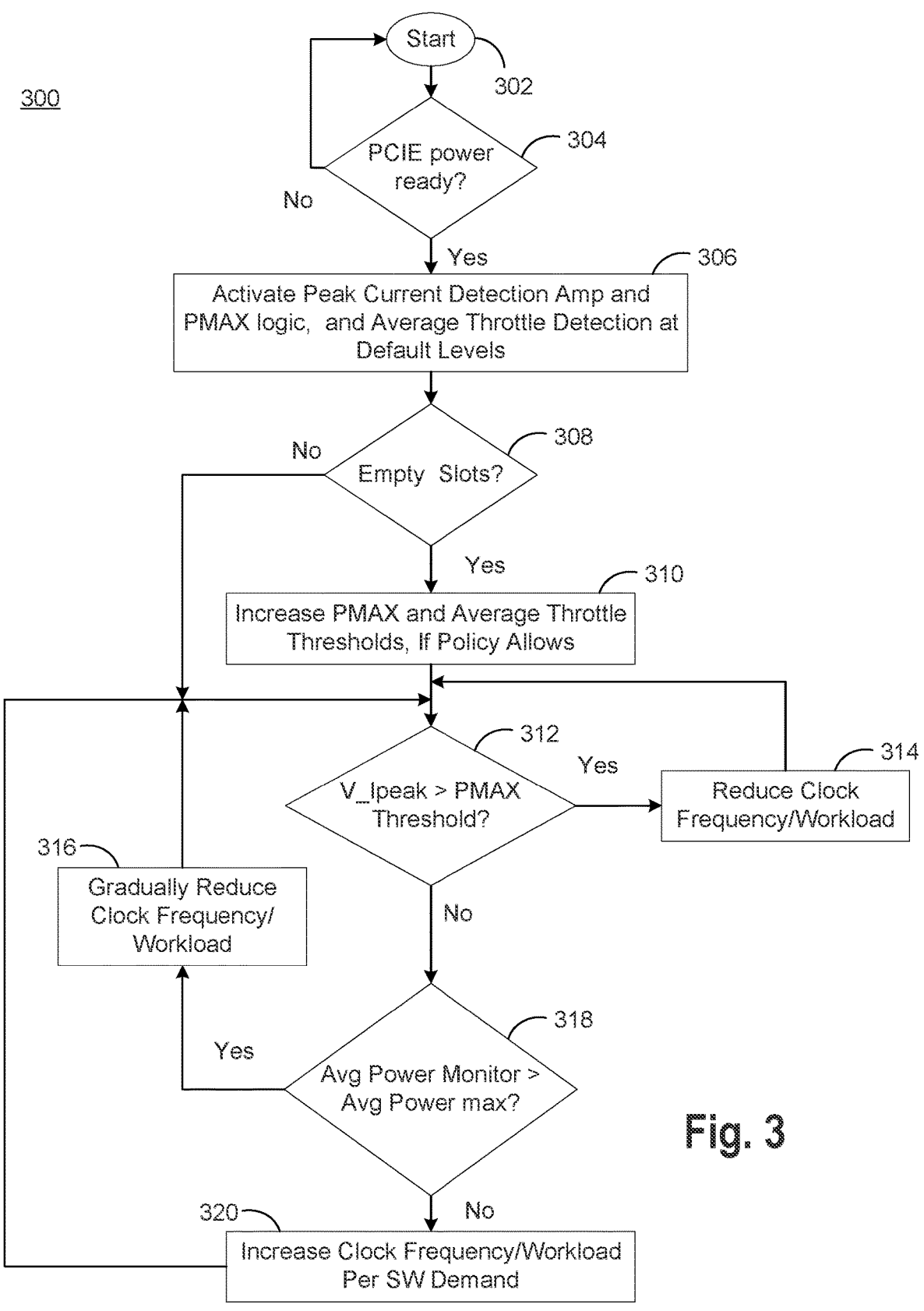
FIG. 3 is a flow diagram for a process for a computer device having two or more expansion cards to combine the individual power budgets of each card and share the combined power budget in accordance with some embodiments.

FIG. 3 is a flow diagram for a process for a computer device comprising two or more expansion cards which is configured to combine the individual power budgets of each card and share the combined power budget in accordance with some embodiments. At 302, the process 300 is started. At 304, it is determined whether power is being provided to an expansion card by a first bus, e.g., a PCIe bus. When it is determined that power is being provided to the expansion card, process 300 advances to operation 306.

Each expansion card includes a current sense amplifier, and at operation 306, each current sense amplifier is activated. Machine-readable instructions or logic for limiting power consumption of an expansion card when a threshold is exceeded is also activated, e.g., instructions executable on an SoC, at 306. In addition, each expansion card includes average power monitoring circuitry. At 306, the average power monitoring circuitry is activated. In various embodiments, current sense amplifiers and average power monitoring circuitry may be activated using default values for maximum instantaneous power and maximum average power.

After current sense amplifiers, power consumption limiting logic, and average power monitoring circuitry are activated, it is determined at 308 whether any of the plurality of expansion slots of the computer device are empty. The power budget of the empty slots may be shared among the expansion slots with cards. At 310, if one or more expansion slots are empty, $P_{MAX}$ may be increased to allocate additional peak power budget for expansion cards that are present in an expansion slot. In some embodiments, a policy may prohibit or limit the amount by which $P_{MAX}$ may be increased. At 310, $P_{MAX}$ is only increased if permitted by policy.

At 312, instantaneous power consumed by each expansion card is monitored and the detected power level of the combined cards is compared with a threshold maximum power level. As described above, the detected instantaneous power consumed by each expansion card is combined or summed, and compared with the threshold maximum power level in a way in which the power budgets of each card are combined and shared. If the instantaneous power threshold is exceeded, $P_{MAX}$ is asserted and operations to limit power consumption are performed at 314. For example, clock frequency or workload may be reduced. As noted above, operations to limit power consumption are initiated for all expansion cards. If the instantaneous power threshold is below the threshold maximum power level, process 300 advances to 318.

At 318, average power consumed by an individual expansion card is monitored. If the detected average power level of the card exceeds a threshold maximum average power level, the clock frequency or workload of the individual card may be reduced at 316. If the detected average power level of the card is below the threshold maximum average power level, the clock frequency or workload of the individual card may be increased at 320. Operations 316, 318, and 320 may be performed for each expansion card and operate independently of other expansion cards. Because these operations are performed based on average power, any throttling to reduce power consumption at 316 may be implemented gradually, i.e., in smaller increments as compared with the operations to limit power consumption are performed at 314, which are based on instantaneous power consumption. The throttling at 314 may be implemented in a single large increment as compared with 316 since the throttling at 314 is based on instantaneous power consumption.

Elements of embodiments (e.g., flowchart with reference to FIG. 3) are also provided as a machine-readable medium for storing the computer-executable instructions (e.g., instructions to implement any other processes discussed herein). In some embodiments, a computing platform comprises memory, a processor, machine-readable storage media (also referred to as tangible machine-readable medium), a communication interface (e.g., wireless or wired interface), and a network bus coupled together.

In some embodiments, the various logic blocks are coupled together via a Network Bus. Any suitable protocol may be used to implement the network bus. In some embodiments, machine-readable storage medium includes instructions (also referred to as the program software code/instructions) for calculating or measuring distance and relative orientation of a device with reference to another device as described with reference to various embodiments and flowchart.

Program software code/instructions associated with the flow diagram of FIG. 3 (and/or various embodiments) and executed to implement embodiments of the disclosed subject matter may be implemented as part of an operating system or a specific application, component, program, object, module, routine, or other sequence of instructions or organization of sequences of instructions referred to as Pcode, "program software code/instructions," "operating system program software code/instructions," "application program software code/instructions," or simply "software" or firmware embedded in processor. In some embodiments, the program software code/instructions associated with the sequence flow diagrams of FIG. 3 (and/or various embodiments) are executed by the system or one or more components thereof.

In some embodiments, the program software code/instructions associated with reference to FIG. 3 (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with reference to FIG. 3 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), ferroelectric memory, resistive RAM, phase change memory (PCM), magnetic RAM (MRAM, among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 4:
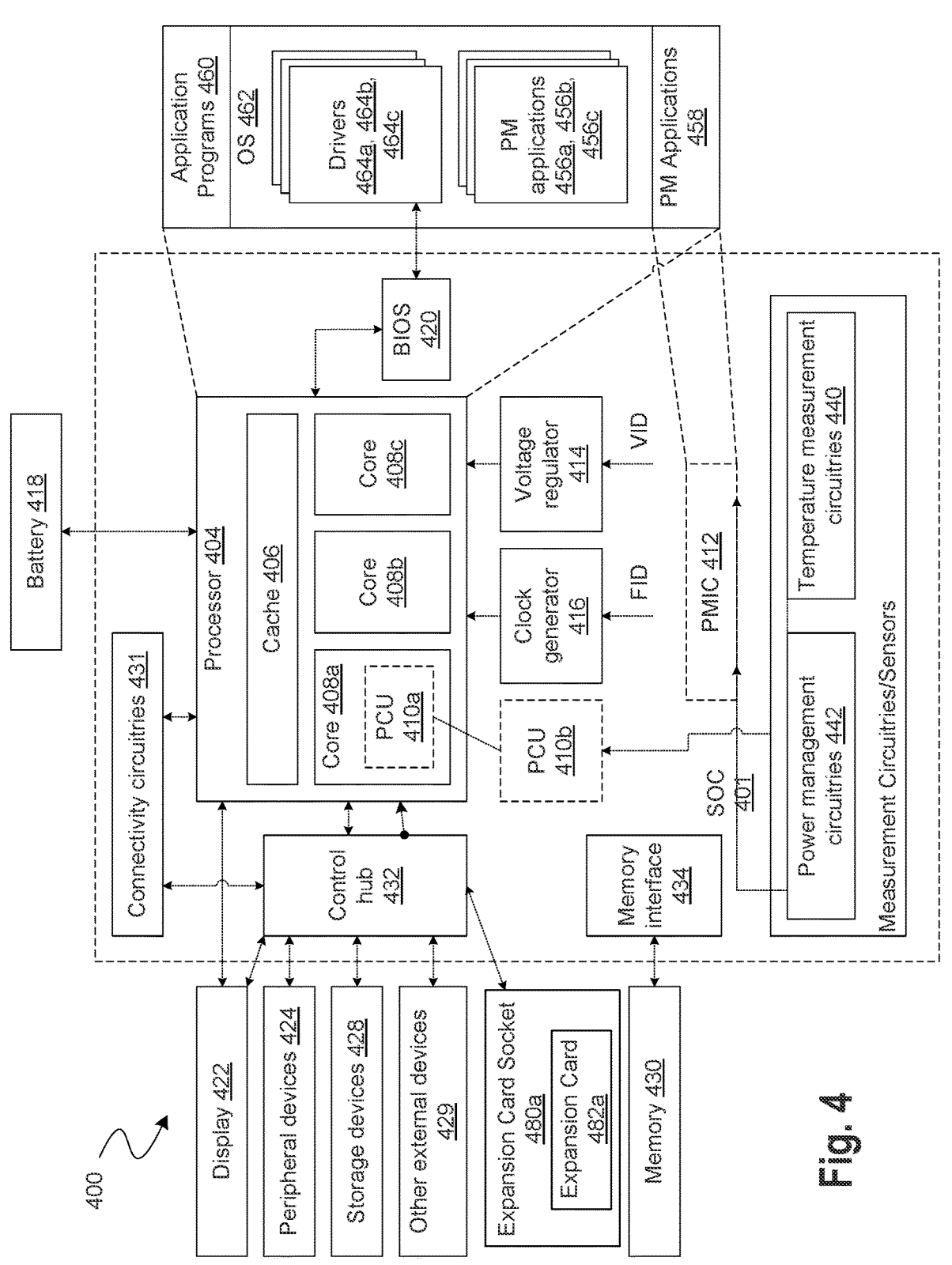
FIG. 4 illustrates a computer system or computing device having two or more expansion cards to combine the individual power budgets of each card and share the combined power budget in accordance with some embodiments.

FIG. 4 illustrates a computer system or computing device to provide power supply communications via a shared channel for performance management in accordance with some embodiments. FIG. 4 illustrates a computer system or computing device 400 (also referred to as device 400) to limit electric current consumption of a module that receives power from a bus, and to assure that the voltage level used by the module and by a host for sideband signaling match, in accordance with some embodiments. It is pointed out that those elements of FIG. 4 having the same reference numbers (or names) as the elements of any other figure can operate or function in any manner similar to that described, but are not limited to such.

In some embodiments, device 400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 400.

In an example, the device 400 comprises a SOC (System-on-Chip) 401. An example boundary of the SOC 401 is illustrated using dotted lines in FIG. 4, with some example components being illustrated to be included within SOC 401—however, SOC 401 may include any appropriate components of device 400.

In some embodiments, device 400 includes processor 404. Processor 404 can include one or more physical devices, such as microprocessors, application processors, microcontrollers, programmable logic devices, processing cores, or other processing means. The processing operations performed by processor 404 include the execution of an operating platform or operating system on which applications and/or device functions are executed. The processing operations include operations related to I/O (input/output) with a human user or with other devices, operations related to power management, operations related to connecting computing device 400 to another device, and/or the like. The processing operations may also include operations related to audio I/O and/or display I/O.

In some embodiments, processor 404 includes multiple processing cores (also referred to as cores) 408a, 408b, 408c. Although merely three cores 408a, 408b, 408c are illustrated in FIG. 4, the processor 404 may include any other appropriate number of processing cores, e.g., tens, or even hundreds of processing cores. Processor cores 408a, 408b, 408c may be implemented on a single integrated circuit (IC) chip. Moreover, the chip may include one or more shared and/or private caches, buses or interconnections, graphics and/or memory controllers, or other components.

In some embodiments, processor 404 includes cache 406. In an example, sections of cache 406 may be dedicated to individual cores 408 (e.g., a first section of cache 406 dedicated to core 408a, a second section of cache 406 dedicated to core 408b, and so on). In an example, one or more sections of cache 406 may be shared among two or more of cores 408. Cache 406 may be split in different levels, e.g., level 1 (L1) cache, level 2 (L2) cache, level 3 (L3) cache, etc.

In some embodiments, a given processor core (e.g., core 408a) may include a fetch unit to fetch instructions (including instructions with conditional branches) for execution by the core 408a. The instructions may be fetched from any storage devices such as the memory 430. Processor core 408a may also include a decode unit to decode the fetched instruction. For example, the decode unit may decode the fetched instruction into a plurality of micro-operations. Processor core 408a may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 408a (for example) may be an out-of-order processor core in one embodiment. Processor core 408a may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 408a may also include a bus unit to enable communication between components of the processor core 408a and other components via one or more buses. Processor core 408a may also include one or more registers to store data accessed by various components of the core 408a (such as values related to assigned app priorities and/or sub-system states (modes) association.

In some embodiments, device 400 comprises connectivity circuitries 431. For example, connectivity circuitries 431 includes hardware devices (e.g., wireless and/or wired connectors and communication hardware) and/or software components (e.g., drivers, protocol stacks), e.g., to enable device 400 to communicate with external devices. Device 400 may be separate from the external devices, such as other computing devices, wireless access points or base stations, etc.

In an example, connectivity circuitries 431 may include multiple different types of connectivity. To generalize, the connectivity circuitries 431 may include cellular connectivity circuitries, wireless connectivity circuitries, etc. Cellular connectivity circuitries of connectivity circuitries 431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 431 may include a network interface, such as a wired or wireless interface, e.g., so that a system embodiment may be incorporated into a wireless device, for example, cell phone or personal digital assistant.

In some embodiments, device 400 comprises control hub 432, which represents hardware devices and/or software components related to interaction with one or more I/O devices. For example, processor 404 may communicate with one or more of display 422, one or more peripheral devices 424, storage devices 428, one or more other external devices 429, etc., via control hub 432. Control hub 432 may be a chipset, a Platform Control Hub (PCH), and/or the like.

For example, control hub 432 illustrates one or more connection points for additional devices that connect to device 400, e.g., through which a user might interact with the system. For example, devices (e.g., devices 429) that can be attached to device 400 include microphone devices, speaker or stereo systems, audio devices, video systems or other display devices, keyboard or keypad devices, or other I/O devices for use with specific applications such as card readers or other devices.

As mentioned above, control hub 432 can interact with audio devices, display 422, etc. For example, input through a microphone or other audio device can provide input or commands for one or more applications or functions of device 400. Additionally, audio output can be provided instead of, or in addition to display output. In another example, if display 422 includes a touch screen, display 422 also acts as an input device, which can be at least partially managed by control hub 432. There can also be additional buttons or switches on computing device 400 to provide I/O functions managed by control hub 432. In one embodiment, control hub 432 manages devices such as accelerometers, cameras, light sensors or other environmental sensors, or other hardware that can be included in device 400. The input can be part of direct user interaction, as well as providing environmental input to the system to influence its operations (such as filtering for noise, adjusting displays for brightness detection, applying a flash for a camera, or other features).

In some embodiments, control hub 432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 422 represents hardware (e.g., display devices) and software (e.g., drivers) components that provide a visual and/or tactile display for a user to interact with device 400. Display 422 may include a display interface, a display screen, and/or hardware device used to provide a display to a user. In some embodiments, display 422 includes a touch screen (or touch pad) device that provides both output and input to a user. In an example, display 422 may communicate directly with the processor 404. Display 422 can be one or more of an internal display device, as in a mobile electronic device or a laptop device or an external display device attached via a display interface (e.g., DisplayPort, etc.). In one embodiment display 422 can be a head mounted display (HMD) such as a stereoscopic display device for use in virtual reality (VR) applications or augmented reality (AR) applications.

In some embodiments and although not illustrated in the figure, in addition to (or instead of) processor 404, device 400 may include Graphics Processing Unit (GPU) comprising one or more graphics processing cores, which may control one or more aspects of displaying contents on display 422.

Control hub 432 (or platform controller hub) may include hardware interfaces and connectors, as well as software components (e.g., drivers, protocol stacks) to make peripheral connections, e.g., to peripheral devices 424.

It will be understood that device 400 could both be a peripheral device to other computing devices, as well as have peripheral devices connected to it. Device 400 may have a "docking" connector to connect to other computing devices for purposes such as managing (e.g., downloading and/or uploading, changing, synchronizing) content on device 400. Additionally, a docking connector can allow device 400 to connect to certain peripherals that allow computing device 400 to control content output, for example, to audiovisual or other systems.

In addition to a proprietary docking connector or other proprietary connection hardware, device 400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 431 may be coupled to control hub 432, e.g., in addition to, or instead of, being coupled directly to the processor 404. In some embodiments, display 422 may be coupled to control hub 432, e.g., in addition to, or instead of, being coupled directly to processor 404.

In some embodiments, device 400 comprises memory 430 coupled to processor 404 via memory interface 434. Memory 430 includes memory devices for storing information in device 400. Memory can include nonvolatile (state does not change if power to the memory device is interrupted) and/or volatile (state is indeterminate if power to the memory device is interrupted) memory devices. Memory device 430 can be a dynamic random access memory (DRAM) device, a static random access memory (SRAM) device, flash memory device, phase-change memory device, or some other memory device having suitable performance to serve as process memory. In one embodiment, memory 430 can operate as system memory for device 400, to store data and instructions for use when the one or more processors 404 executes an application or process. Memory 430 can store application data, user data, music, photos, documents, or other data, as well as system data (whether long-term or temporary) related to the execution of the applications and functions of device 400.

Elements of various embodiments and examples are also provided as a machine-readable medium (e.g., memory 430) for storing the computer-executable instructions (e.g., instructions to implement any other processes discussed herein). The machine-readable medium (e.g., memory 430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 400 comprises temperature measurement circuitries 440, e.g., for measuring temperature of various components of device 400. In an example, temperature measurement circuitries 440 may be embedded, or coupled or attached to various components, whose temperature are to be measured and monitored. For example, temperature measurement circuitries 440 may measure temperature of (or within) one or more of cores 408a, 408b, 408c, voltage regulator 414, memory 430, a mother-board of SOC 401, and/or any appropriate component of device 400.

In some embodiments, device 400 comprises power measurement circuitries 442, e.g., for measuring power consumed by one or more components of the device 400. In an example, in addition to, or instead of, measuring power, the power measurement circuitries 442 may measure voltage and/or current. In an example, the power measurement circuitries 442 may be embedded, or coupled or attached to various components, whose power, voltage, and/or current consumption are to be measured and monitored. For example, power measurement circuitries 442 may measure power, current and/or voltage supplied by one or more voltage regulators 414, power supplied to SOC 401, power supplied to device 400, power consumed by processor 404 (or any other component) of device 400, etc.

In some embodiments, device 400 comprises one or more voltage regulator circuitries, generally referred to as voltage regulator (VR) 414. VR 414 generates signals at appropriate voltage levels, which may be supplied to operate any appropriate components of the device 400. Merely as an example, VR 414 is illustrated to be supplying signals to processor 404 of device 400. In some embodiments, VR 414 receives one or more Voltage Identification (VID) signals, and generates the voltage signal at an appropriate level, based on the VID signals. Various type of VRs may be utilized for the VR 414. For example, VR 414 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 410a/b and/or PMIC 412. In some embodiments, each core has a network of distributed LDOs to provide efficient control for power management. The LDOs can be digital, analog, or a combination of digital or analog LDOs.

In some embodiments, device 400 comprises one or more clock generator circuitries, generally referred to as clock generator 416. Clock generator 416 generates clock signals at appropriate frequency levels, which may be supplied to any appropriate components of device 400. Merely as an example, clock generator 416 is illustrated to be supplying clock signals to processor 404 of device 400. In some embodiments, clock generator 416 receives one or more Frequency Identification (FID) signals, and generates the clock signals at an appropriate frequency, based on the FID signals.

In some embodiments, device 400 comprises battery 418 supplying power to various components of device 400. Merely as an example, battery 418 is illustrated to be supplying power to processor 404. Although not illustrated in the figures, device 400 may comprise a charging circuitry, e.g., to recharge the battery, based on Alternating Current (AC) power supply received from an AC adapter.

In some embodiments, device 400 comprises Power Control Unit (PCU) 410 (also referred to as Power Management Unit (PMU), Power Controller, etc.). In an example, some sections of PCU 410 may be implemented by one or more processing cores 408, and these sections of PCU 410 are symbolically illustrated using a dotted box and labelled PCU 410a. In an example, some other sections of PCU 410 may be implemented outside the processing cores 408, and these sections of PCU 410 are symbolically illustrated using a dotted box and labelled as PCU 410b. PCU 410 may implement various power management operations for device 400. PCU 410 may include hardware interfaces, hardware circuitries, connectors, registers, etc., as well as software components (e.g., drivers, protocol stacks), to implement various power management operations for device 400.

In some embodiments, device 400 comprises Power Management Integrated Circuit (PMIC) 412, e.g., to implement various power management operations for device 400. In some embodiments, PMIC 412 is a Reconfigurable Power Management ICs (RPMICs) and/or an IMVP (Intel® Mobile Voltage Positioning). In an example, the PMIC is within an IC chip separate from processor 404. PMIC 412 may implement various power management operations for device 400. PMIC 412 may include hardware interfaces, hardware circuitries, connectors, registers, etc., as well as software components (e.g., drivers, protocol stacks), to implement various power management operations for device 400.

In an example, device 400 comprises one or both PCU 410 or PMIC 412. In an example, any one of PCU 410 or PMIC 412 may be absent in device 400, and hence, these components are illustrated using dotted lines.

Various power management operations of device 400 may be performed by PCU 410, by PMIC 412, or by a combination of PCU 410 and PMIC 412. For example, PCU 410 and/or PMIC 412 may select a power state (e.g., P-state) for various components of device 400. For example, PCU 410 and/or PMIC 412 may select a power state (e.g., in accordance with the ACPI (Advanced Configuration and Power Interface) specification) for various components of device 400. Merely as an example, PCU 410 and/or PMIC 412 may cause various components of the device 400 to transition to a sleep state, to an active state, to an appropriate C state (e.g., C0 state, or another appropriate C state, in accordance with the ACPI specification), etc. In an example, PCU 410 and/or PMIC 412 may control a voltage output by VR 414 and/or a frequency of a clock signal output by the clock generator, e.g., by outputting the VID signal and/or the FID signal, respectively. In an example, PCU 410 and/or PMIC 412 may control battery power usage, charging of battery 418, and features related to power saving operation.

The clock generator 416 can comprise a phase locked loop (PLL), frequency locked loop (FLL), or any suitable clock source. In some embodiments, each core of processor 404 has its own clock source. As such, each core can operate at a frequency independent of the frequency of operation of the other core. In some embodiments, PCU 410 and/or PMIC 412 performs adaptive or dynamic frequency scaling or adjustment. For example, clock frequency of a processor core can be increased if the core is not operating at its maximum power consumption threshold or limit. In some embodiments, PCU 410 and/or PMIC 412 determines the operating condition of each core of a processor, and opportunistically adjusts frequency and/or power supply voltage of that core without the core clocking source (e.g., PLL of that core) losing lock when the PCU 410 and/or PMIC 412 determines that the core is operating below a target performance level. For example, if a core is drawing current from a power supply rail less than a total current allocated for that core or processor 404, then PCU 410 and/or PMIC 412 can temporarily increase the power draw for that core or processor 404 (e.g., by increasing clock frequency and/or power supply voltage level) so that the core or processor 404 can perform at a higher performance level. As such, voltage and/or frequency can be increased temporality for processor 404 without violating product reliability.

In an example, PCU 410 and/or PMIC 412 may perform power management operations, e.g., based at least in part on receiving measurements from power measurement circuitries 442, temperature measurement circuitries 440, charge level of battery 418, and/or any other appropriate information that may be used for power management. To that end, PMIC 412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 410 and/or PMIC 412 in at least one embodiment to allow PCU 410 and/or PMIC 412 to manage processor core energy at least in part based on value(s) detected by one or more of the sensors.

Also illustrated is an example software stack of device 400 (although not all elements of the software stack are illustrated). Merely as an example, processors 404 may execute application programs 460, Operating System 462, one or more Power Management (PM) specific application programs (e.g., generically referred to as PM applications 458), and/or the like. PM applications 458 may also be executed by the PCU 410 and/or PMIC 412. OS 462 may also include one or more PM applications 456*a*, 456*b*, 456*c*. The OS 462 may also include various drivers 464*a*, 464*b*, 464*c*, etc., some of which may be specific for power management purposes. In some embodiments, device 400 may further comprise a Basic Input/Output System (BIOS) 420. BIOS 420 may communicate with OS 462 (e.g., via one or more drivers 464), communicate with processors 404, etc.

For example, one or more of PM applications 458, 456, drivers 464, BIOS 420, etc. may be used to implement power management specific tasks, e.g., to control voltage and/or frequency of various components of device 400, to control wake-up state, sleep state, and/or any other appropriate power state of various components of device 400, control battery power usage, charging of the battery 418, features related to power saving operation, etc.

In various embodiments, device 400 comprises a plurality of expansion card sockets 480. Only expansion card socket 480*a* is shown in FIG. 4. Additional expansion card sockets are omitted from the figure for the purpose of illustrative clarity. In various embodiments, two or more of the plurality of expansion card sockets 480 have an expansion card inserted therein to couple each expansion card 482 via a socket with control hub 432 via a first bus. In embodiments, each socket may be coupled with a separate first bus and each of the first busses may be a PCIe bus. Only expansion card 482*a* is shown in FIG. 4. Additional expansion cards are omitted from the figure for the purpose of illustrative clarity.

In various embodiments, device 400 comprises a second bus (not shown in the figure) to couple the expansion cards 482 with one another so as to communicate a first signal and a second signal between the expansion cards 482.

In some embodiments, one of the expansion cards 482 comprises a first printed circuit board (PCB) comprising: a first hardware interface compatible with an interface standard. The device 400 comprises a second PCB, such as a motherboard. As mentioned above, the second PCB includes a first bus coupled to a first socket, and a second bus coupled to a second socket. The first hardware interface is for coupling the first PCB to the first socket of the second PCB, e.g., a socket on a motherboard. In addition, the first PCB comprises a second hardware interface to communicate a first signal and a second signal each with a third PCB of a second expansion card while the third PCB is coupled to the second PCB at the second socket. The first PCB also includes first circuitry coupled to receive power via the first hardware interface, second circuitry to impose a first limit on a first power consumption by the first PCB, third circuitry, coupled to the first hardware interface and to the second hardware interface, to generate, with the third PCB, the first signal, which is to indicate a total current drawn by multiple PCBs comprising the first PCB and the third PCB. Further, the first PCB includes fourth circuitry, coupled to the third circuitry and to the second hardware interface, to generate, with the third PCB and based on the first signal, the second signal, which is to provide, for each of the multiple PCBs, a respective indication of whether respective circuitry of the PCB is to be throttled, wherein the second signal is to indicate whether the first circuitry is to be throttled.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: A first printed circuit board (PCB) comprising: a first hardware interface, compatible with an interface standard, to couple the first PCB to a first socket of a second PCB which further comprises a second socket, a first bus coupled to the first socket, and a second bus coupled to the second socket; a second hardware interface to communicate a first signal and a second signal each with a third PCB while the third PCB is coupled to the second PCB at the second socket; first circuitry coupled to receive power via the first hardware interface; second circuitry to impose a first limit on a first power consumption by the first PCB; third circuitry, coupled to the first hardware interface and to the second hardware interface, to generate, with the third PCB, the first signal, which is to indicate a total current drawn by multiple PCBs comprising the first PCB and the third PCB; and fourth circuitry, coupled to the third circuitry and to the second hardware interface, to generate, with the third PCB and based on the first signal, the second signal, which is to provide, for each of the multiple PCBs, a respective indication of whether respective circuitry of the PCB is to be throttled, the second signal is to indicate whether the first circuitry is to be throttled.

Example 2: The first PCB of example 1, wherein the interface standard is identified in a peripheral interconnect specification, and wherein the second circuitry is to impose the first limit according to the peripheral interconnect specification.

Example 3: The first PCB of example 2, wherein the interface standard is a Peripheral Component Interconnect Express (PCIe) standard.

Example 4: The first PCB of example 1, wherein: the second PCB is to further comprise a third socket, a fourth socket, and a third bus which is coupled to each of the third socket and the fourth socket; and the second hardware interface is to couple to the second PCB via the third socket.

Example 5: The first PCB of example 1, wherein the fourth circuitry comprises a comparator circuit coupled to receive the first signal and a control reference voltage, wherein the second signal is to be generated, with an open drain transistor of the comparator circuit, based on a difference between the first signal and the control reference voltage.

Example 6: The first PCB of example 5, wherein: the second hardware interface comprises a first conductive contact and a second conductive contact to communicate, respectively, the first signal and the second signal; and the open drain transistor is coupled to a pull-up resistor and the second conductive contact is coupled to a common reference voltage via a load resistor.

Example 7: The first PCB of example 5, wherein: the second PCB further comprises: a third socket and a third bus coupled to the third socket; fifth circuitry to determine that the third socket is unoccupied and to determine a power budget value for the control reference voltage based on the third socket being unoccupied; and the first PCB further comprises sixth circuitry to receive the power budget value from the host and to provide the control reference voltage to the comparator circuit based on the received power budget value.

Example 8: The first PCB of example 1, wherein: the first signal is to indicate an instantaneous total current drawn by the multiple PCBs; and the first PCB further comprises fifth circuitry to determine average power consumption by the first PCB; and the second circuitry is further to impose a second limit on average power consumption by the first PCB.

Example 9: The first PCB of example 8, wherein the interface standard is identified in a peripheral interconnect specification, and wherein the second circuitry is to impose the second limit according to the peripheral interconnect specification.

Example 10: The first PCB of example 9, wherein the interface standard is a Peripheral Component Interconnect Express (PCIe) standard.

Example 11: A first printed circuit board (PCB) comprising: a first socket and a second socket to couple the first PCB to, respectively, a second PCB and a third PCB; a first bus coupled to the first socket and a second bus coupled to the second socket; a first hardware interface to further couple the first PCB to the second PCB; a second hardware interface to further couple the first PCB to the second PCB; a third bus coupled to each of the first hardware interface and the second hardware interface, the third bus, comprising: a first signal line to communicate a first signal which is to indicate, to each of multiple PCBs comprising the second PCB and the third PCB, a total current drawn by the multiple PCBs; a second signal line to communicate a second signal which is based on the first signal, wherein the second signal is to provide, for each of the multiple PCBs, a respective indication of whether respective circuitry of the PCB is to be throttled.

Example 12: The first PCB of example 11, wherein the first socket and the second socket are each compatible with an interface standard identified in a peripheral interconnect specification, and wherein the second PCB comprises circuitry to impose a first limit according to the peripheral interconnect specification.

Example 13: The first PCB of example 12, wherein the interface standard is a Peripheral Component Interconnect Express (PCIe) standard.

Example 14: The first PCB of example 11, wherein the second PCB comprises: a third hardware interface to couple to the first socket, wherein the third hardware interface is compatible with an interface standard; a fourth hardware interface to communicate the first signal and the second signal each with the third PCB while the third PCB is coupled to the first PCB at the second socket; first circuitry coupled to receive power via the third hardware interface; second circuitry to impose a first limit on a first power consumption by the second PCB; third circuitry, coupled to the third hardware interface and to the fourth hardware interface, to generate, with the third PCB, a first signal which is to indicate a total current drawn by the multiple PCBs comprising the second PCB and the third PCB; and fourth circuitry, coupled to the third circuitry and to the fourth hardware interface, to generate, with the third PCB and based on the first signal, a second signal which is to provide, for each of the multiple PCBs, a respective indication of whether respective circuitry of the PCB is to be throttled, wherein the second signal is to indicate whether the first circuitry is to be throttled.

Example 15: The first PCB of example 14, wherein the interface standard is identified in a peripheral interconnect specification, and wherein the second circuitry is to impose the first limit according to the peripheral interconnect specification.

Example 16: The first PCB of example 15, wherein the interface standard is a Peripheral Component Interconnect Express (PCIe) standard.

Example 17: A system comprising: a first printed circuit board (PCB) comprising a first hardware interface, a second hardware interface, first circuitry to receive power via the first hardware interface, and second circuitry to impose a first limit on a first power consumption by the first PCB; a second PCB comprising a first bus coupled to a first socket, and a second bus coupled to a second socket, wherein the first hardware interface is coupled with the first socket, and the second hardware interface is to communicate a first signal and a second signal each with a third PCB while the third PCB is coupled to the second PCB at the second socket; and wherein the first PCB further comprises: third circuitry, coupled to the first hardware interface and to the second hardware interface, to generate, with the third PCB, the first signal, which is to indicate a total current drawn by multiple PCBs comprising the first PCB and the third PCB; and fourth circuitry, coupled to the third circuitry and to the second hardware interface, to generate, with the third PCB and based on the first signal, the second signal, which is to provide, for each of the multiple PCBs, a respective indication of whether respective circuitry of the PCB is to be throttled.

Example 18: The system of example 17, wherein the first hardware interface is compatible with an interface standard identified in a peripheral interconnect specification, and wherein the second circuitry is to impose the first limit according to the peripheral interconnect specification.

Example 19: The system of example 18, wherein the interface standard is a Peripheral Component Interconnect Express (PCIe) standard.

Example 20: The system of example 17, wherein: the second PCB is to further comprise a third socket, a fourth socket, and a third bus which is coupled to each of the third socket and the fourth socket; and the second hardware interface is to couple to the second PCB via the third socket.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A first expansion card comprising:
a first hardware interface, compatible with an interface standard, to couple the first expansion card to a first socket of a printed circuit board (PCB) which further comprises a second socket, a first bus coupled to the first socket, and a second bus coupled to the second socket;
a second hardware interface to communicate a first signal and a second signal each with a second expansion card while the second expansion card is coupled to the PCB at the second socket;
first circuitry coupled to receive power via the first hardware interface;
second circuitry to impose a first limit on a first power consumption by the first expansion card;
third circuitry, coupled to the first hardware interface and to the second hardware interface, to generate, with the second expansion card, the first signal, which is to indicate a total current drawn by multiple expansion cards comprising the first expansion card and the second expansion card; and
fourth circuitry, coupled to the third circuitry and to the second hardware interface, to generate, with the second expansion card and based on the first signal, the second signal, which is to provide, for each of the multiple expansion cards, a respective indication of whether respective circuitry of the expansion card is to be throttled, wherein the second signal is to indicate whether the first circuitry is to be throttled.

2. The first expansion card of claim 1, wherein the interface standard is identified in a peripheral interconnect specification, and wherein the second circuitry is to impose the first limit according to the peripheral interconnect specification.

3. The first expansion card of claim 2, wherein the interface standard is a Peripheral Component Interconnect Express (PCIe) standard.

4. The first expansion card of claim 1, wherein:
the PCB is to further comprise a third socket, a fourth socket, and a third bus which is coupled to each of the third socket and the fourth socket; and
the second hardware interface is to couple to the PCB via the third socket.

5. The first expansion card of claim 1, wherein the fourth circuitry comprises a comparator circuit coupled to receive the first signal and a control reference voltage, wherein the second signal is to be generated, with an open drain transistor of the comparator circuit, based on a difference between the first signal and the control reference voltage.

6. The first expansion card of claim 5, wherein:
the second hardware interface comprises a first conductive contact and a second conductive contact to communicate, respectively, the first signal and the second signal; and the open drain transistor is coupled to a pull-up resistor and the second conductive contact is coupled to a common reference voltage via a load resistor.

7. The first expansion card of claim 5, wherein:
the PCB further comprises:
a third socket and a third bus coupled to the third socket;
fifth circuitry to determine that the third socket is unoccupied and to determine a power budget value for the control reference voltage based on the third socket being unoccupied; and
the first expansion card further comprises sixth circuitry to receive the power budget value from a host and to provide the control reference voltage to the comparator circuit based on the received power budget value.

8. The first expansion card of claim 1, wherein:
the first signal is to indicate an instantaneous total current drawn by the multiple expansion cards; and
the first expansion card further comprises fifth circuitry to determine an average power consumption by the first expansion card; and
the second circuitry is further to impose a second limit on average power consumption by the first expansion card.

9. The first expansion card of claim 8, wherein the interface standard is identified in a peripheral interconnect specification, and wherein the second circuitry is to impose the second limit according to the peripheral interconnect specification.

10. The first expansion card of claim 9, wherein the interface standard is a Peripheral Component Interconnect Express (PCIe) standard.

11. A printed circuit board (PCB) comprising:
a first socket and a second socket to couple the PCB to, respectively, a first expansion card and a second expansion card;
a first bus coupled to the first socket and a second bus coupled to the second socket;
a first hardware interface to further couple the PCB to the first expansion card;
a second hardware interface to further couple the PCB to the first expansion card;
a third bus coupled to each of the first hardware interface and the second hardware interface, the third bus, comprising:
a first signal line to communicate a first signal which is to indicate, to each of multiple expansion cards comprising the first expansion card and the second expansion card, a total current drawn by the multiple expansion cards; and
a second signal line to communicate a second signal which is based on the first signal, wherein the second signal is to provide, for each of the multiple expansion cards, a respective indication of whether respective circuitry of the expansion card is to be throttled.

12. The PCB of claim 11, wherein the first socket and the second socket are each compatible with an interface standard identified in a peripheral interconnect specification, and wherein the first expansion card comprises circuitry to impose a first limit according to the peripheral interconnect specification.

13. The PCB of claim 12, wherein the interface standard is a Peripheral Component Interconnect Express (PCIe) standard.

14. The PCB of claim 11, wherein the first expansion card comprises:

a third hardware interface to couple to the first socket, wherein the third hardware interface is compatible with an interface standard;
a fourth hardware interface to communicate the first signal and the second signal each with the second expansion card while the second expansion card is coupled to the PCB at the second socket;
first circuitry coupled to receive power via the third hardware interface;
second circuitry to impose a first limit on a first power consumption by the first expansion card;
third circuitry, coupled to the third hardware interface and to the fourth hardware interface, to generate, with the second expansion card, a first signal which is to indicate a total current drawn by the multiple expansion cards comprising the first expansion card and the second expansion card; and
fourth circuitry, coupled to the third circuitry and to the fourth hardware interface, to generate, with the second expansion card and based on the first signal, a second signal which is to provide, for each of the multiple expansion cards, a respective indication of whether respective circuitry of the expansion card is to be throttled, wherein the second signal is to indicate whether the first circuitry is to be throttled.

15. The PCB of claim 14, wherein the interface standard is identified in a peripheral interconnect specification, and wherein the second circuitry is to impose the first limit according to the peripheral interconnect specification.

16. The PCB of claim 15, wherein the interface standard is a Peripheral Component Interconnect Express (PCIe) standard.

17. A system comprising:
a first expansion card comprising a first hardware interface, a second hardware interface, first circuitry to receive power via the first hardware interface, and second circuitry to impose a first limit on a first power consumption by the first expansion card;
a PCB comprising a first bus coupled to a first socket, and a second bus coupled to a second socket, wherein the first hardware interface is coupled with the first socket, and the second hardware interface is to communicate a first signal and a second signal each with a second expansion card while the second expansion card is coupled to the PCB at the second socket; and
wherein the first expansion card further comprises: third circuitry, coupled to the first hardware interface and to the second hardware interface, to generate, with the second expansion card, the first signal, which is to indicate a total current drawn by multiple expansion cards comprising the first expansion card and the second expansion card; and fourth circuitry, coupled to the third circuitry and to the second hardware interface, to generate, with the second expansion card and based on the first signal, the second signal, which is to provide, for each of the multiple expansion cards, a respective indication of whether respective circuitry of the expansion card is to be throttled.

18. The system of claim 17, wherein the first hardware interface is compatible with an interface standard identified in a peripheral interconnect specification, and wherein the second circuitry is to impose the first limit according to the peripheral interconnect specification.

19. The system of claim 18, wherein the interface standard is a Peripheral Component Interconnect Express (PCIe) standard.

20. The system of claim 17, wherein:

the PCB is to further comprise a third socket, a fourth socket, and a third bus which is coupled to each of the third socket and the fourth socket; and the second hardware interface is to couple to the PCB via the third socket.

* * * * *